April 15, 1969 P. A. DENNIS 3,439,156

ANALOG COMPUTER

Filed April 29, 1963 Sheet 1 of 2

INVENTOR.
PAUL A. DENNIS
BY
Nilsson & Robbins
ATTORNEYS.

INVENTOR.
PAUL A. DENNIS
BY
Nilsson & Robbins
ATTORNEYS.

United States Patent Office 3,439,156

Patented Apr. 15, 1969

3,439,156
ANALOG COMPUTER

Paul A. Dennis, 2810 Tennyson Place, Hermosa Beach, Calif. 90254

Filed Apr. 29, 1963, Ser. No. 276,567
Int. Cl. G06g *7/18*
U.S. Cl. 235—183 3 Claims The present invention relates to an analog computer which may be embodied in a compact, relatively inexpensive, machine which may be readily used on a desk top, and easily carried from one location to another.

In recent years the art of electronic computers has received considerable attention with the result that significant strides have been made in that field. However, the major portion of developments in the computer art have been directed toward large, sophisticated and complex systems for solving vast mathematical problems. As a result, there has remained a need for a small, inexpensive computer which would be readily available for students, engineers, and mathematicians, to perform studies which would still be difficult and tedious to perform manually.

In general, the present invention comprises an analog computing system which may be embodied in a small physical unit. The system incorporates computing amplifiers which are capable of performing various mathematical manipulations as those of summation, multiplication, and integration. These amplifiers, though economical in form, are relatively accurate and reliable.

A plurality of amplifier circuits, as considered above, may be provided in a computer according to the present invention and interconnected in accordance with a predetermined program of operation whereby to provide the solution of a desired problem. In such an arrangement, predetermined electrical signals from the amplifier circuits may be manifest by selective application to a metering unit that provides a visual indication to the operator so that the operator may plot a desired signal relative to time, using a portion of the computing system.

An object of the present invention is to provide an improved electronic analog computer.

Another object of the present invention is to provide an analog computer which may be relatively-inexpensively manufactured, and which provides good reliability over an extended interval of use.

Still another object of the present invention is to provide an analog computer incorporating a plotter, or input follower, which is relatively inexpensive to manufacture.

These and other objects and advantages of the present invention will become apparent to one skilled in the art from a consideration of the following, taken in conjunction with the appended drawings, wherein.

Figure 1:
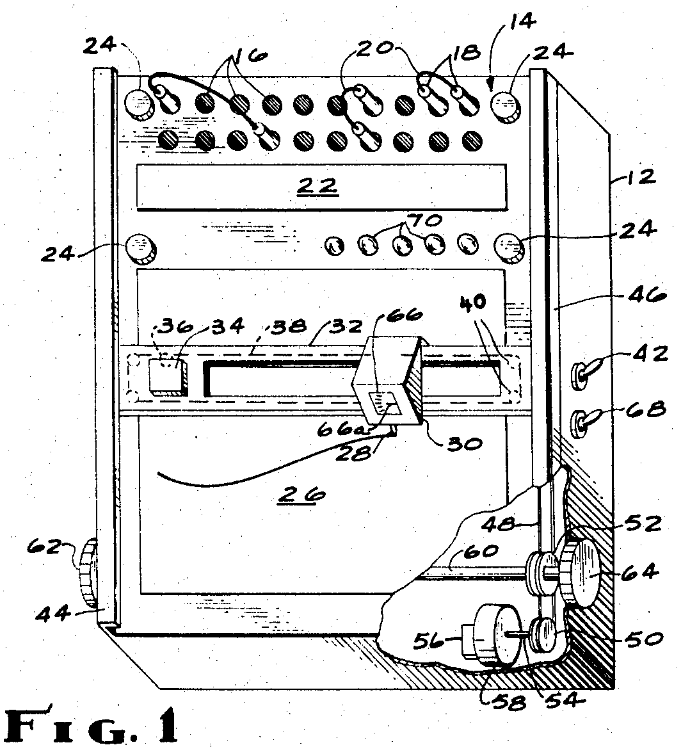
FIGURE 1 is a perspective view of an analog computer constructed in accordance with the present invention.

Referring initially to FIGURE 1, the illustrative embodiment of the present invention is contained in a housing 12 of generally rectangular form the upper surface 14 of which is divided into several panels. The rear of the surface 14 contains a plurality of receptacles 16 to receive the plugs 18 of programming connectors 20. The receptacles 16 provide connection to electrical circuits within the housing 12 (described below) which are capable of manipulating various electrical signals to accomplish mathematical functions, e.g., multiplication, summation, integration and so on. Of course, depending upon the problem undergoing solution, these computing circuits are interconnected in accordance with various programs. Therefore, the connectors 20 serve to accomplish the interconnection of computing elements in accordance with the desired program, as well known in the prior art, to effect the solution of a particular mathematical problem. The various receptacles 16 are identified by labels carried on a section 22 of the surface 14 lying adjacent the receptacles 16.

In addition to the electrical computing elements contained in the housing 12, elements are also contained for generating coefficients and numerical values. The magnitudes of such parameters is selected by a plurality of knobs 24 deposed about the rear of the surface 14. That is, by adjusting the knobs 24 a predetermined coefficient or numerical value is available and represented as an electrical signal within the system described below.

In the operation of the system contained within the housing 12 to generate the solution of a mathematical problem, electrical signals manifest various numerical values and normally certain particular electrical signals manifest the desired solution to a problem. Normally, the structure for plotting these signals is extremely complex and expensive; however, in the system of the present invention the plotter comprises a tool which cooperates with the actual computing system to enable an operator to manually plot the output signal or quantity.

Specifically, the output signal is balanced against a generated signal to provide a difference indication visually perceptible to the operator which directs the operator in the movement to plot the desired curve or solution.

Considering the structure for performance of this operation, the forward portion of the surface 14 comprises a plotting board 26 adapted to carry a sheet of plotting paper to be scribed upon by a pen 28. The pen 28 is mounted in a bridge 30 which is in turn mounted to traverse a carriage 32. A clock motor 34 mounted at one end of the carriage 32 revolves a drive wheel 36 which receives a cord 38 (shown in phantom) which passes over pulleys 40 and is affixed to the bridge 30. Therefore, when the clock motor 34 is energized by closing a switch 42 (mounted at the side of the housing 12) it revolves the drive wheel 36 at a relatively constant rate, traversing the bridge 30 from left to right across the carriage 32.

As the bridge 30 is traversed across the plotting board 26, the pen 28 is displaced relative to the board to manifest the change of an independent variable, i.e., time. The displacement of the pen 28 in an opposite direction to manifest changes in a dependent variable is accomplished by manually traversing the carriage 32 relative the plotting board 26 as now considered.

The carriage 32 is mounted in slide tracks 44 and 46 affixed at the sides of the surface 14. Therefore, the carriage is freely movable to traverse across the plotting board 26. The right side of the carriage 32 receives an attached cord 48 which passes over pulleys (not shown) at the rear of the unit, and in an endless loop also passes over a potentiometer pulley 50 and a drive pulley 52. The potentiometer pulley 50 is affixed on a shaft 54 that is supported by a bracket 56 affixed to the bottom of the housing 12. The shaft 54 also carries an electrical potentiometer unit 56 which serves to provide an electrical signal that is balanced against an output signal from the computing elements desired to be plotted as a dependent quantity.

The pulley 52 is coaxially affixed on a shaft 60 extending the full width of the housing 12 and beyond to receive handles, i.e. knobs 62 and 64. As the knobs 62 and 64 are revolved, the potentiometer 58 is variously set to provide a signal that is applied to a meter 66 mounted on the bridge 30. The meter 66 also receives the signal which is to be plotted and therefore balances the two received signals to manifest their difference. As the position of the carriage 32 is directly related to the amplitude of the signal from the potentiometer 58, it may be seen that when the meter 56 indicates a balanced condition, the signal from the potentiometer 58 coincides with the signal to be plotted and therefore the displacement of the carriage 32 properly manifests the selected output electrical signal.

In this manner, the operator can servo the pen 28 to manifest the dependent quantity and thereby render an accurate plot of the output signal manifesting that quantity.

The accomplishment of this operation does not require a high degree of skill; however, it has been discovered that by the selective placement of the meter 66 on the carriage 32, and specifically upon the bridge 30, the operation is simplified. However, depending upon the sense of the voltages applied to the meter 66, either negative or positive feedback may be accomplished with reference to the operator. That is, depending upon the manner in which the signals to be summed are applied to the meter 66, his movement of the carriage 32 will change his point of observation of the needle 66A to deceptively cause the needle 66A to move either in the direction it is actually changing or opposed to the direction it is actually changing. After a few brief tests, it is relatively easy to determine the type of feedback on operator should receive and the connections in programs may be simply made to provide that type feedback.

In the above consideration of the system of FIGURE 1, the mechanical aspects of the system have been explained. Certain components shown in FIGURE 1 also function in the electrical system of the computer and will now be described.

Adjacent the switch 42 on the side of the housing 12 is a second switch 68. This switch 68 normally serves to set the electrical system, i.e., the computing amplifiers in a standby mode or state in which they are ready to compute but are not actually computing. Of course various other switches as 42 and 68 may be provided in conjunction with the electrical system of the invention if individual control is desired.

Adjacent the plotting board 26 are a plurality of lamps 70 which may take the form of neon tubes functioning in the system generally as voltage regulators as for example in the power supply. By mounting these lamps 70 on the surface 14 of the housing 12, a maintenance aid is provided which is extremely useful in repairing or servicing the unit. That is, people familiar with the detailed circuits of the system may be given a clue to a defective element simply by watching the operation of the lamps 70.

Figure 2:
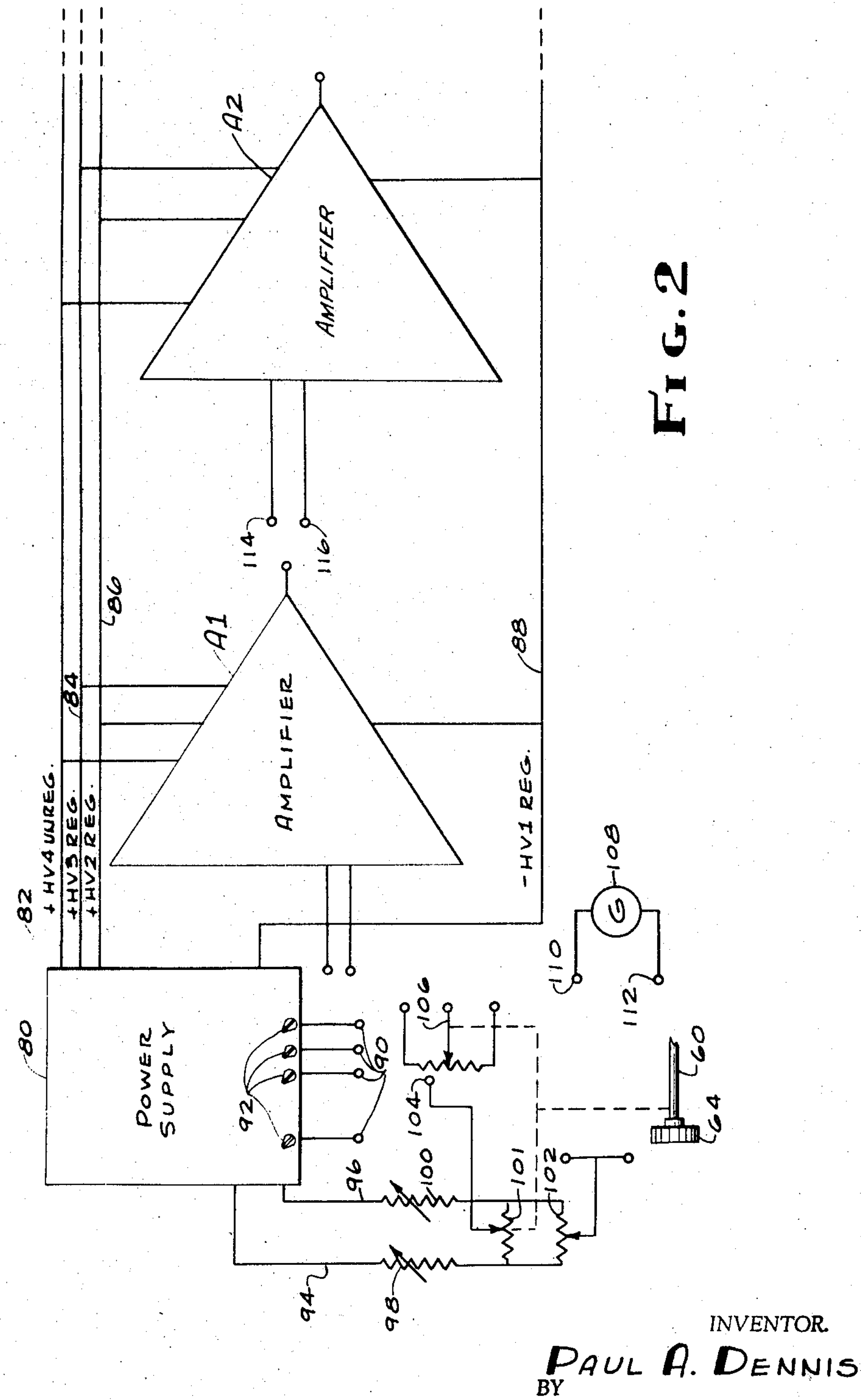
FIGURE 2 is a diagrammatic representation of the electrical system within the computer of FIGURE 1.

Referring now to FIGURE 2, the electrical system of the analog computer shown in FIGURE 1 will be considered. The system includes a power supply 80 which may take a variety of forms as well known in the prior art; however, which is capable of providing several different levels of potential. First, the power supply provides a coltage +HV4 (unregulated) on a bus 82. The voltage HV4 is the highest voltage applied in the system and may for example approximate 290 volts. A second positive voltage from the power supply 80 is provided on bus 84 and is a regulated voltage identified as +HV3. This voltage may take the form of a regulated potential derived from the unregulated voltage HV4 and in one successful operating embodiment has been developed at 180 volts. The third positive voltage +HV2 is applied to a bus 86 and is a regulated voltage reduced from the voltage HV3, for example in the range considered, 60 volts.

In addition to the driving voltages considered above, the power supply 80 also furnishes a negative voltage —HV1 which is a regulated voltage and is applied to the bus 88. The voltages carried in the buses 82, 84, 86 and 88 serve as driving voltages for the computing amplifiers of the system. In FIGURE 2, amplifiers A1 and A2 are indicated to represent a plurality of such units. However, as is readily apparent, additional amplifiers may be provided to increase the capability of the computer and in general, successful operating embodiments would normally incorporate three or more such similar amplifiers.

Returning now to the power supply 80 a variety of fixed voltages are applied from the power supply to terminals 90. These voltages may be set at various magnitudes by adjusting knobs 92 to accomplish circuit changes as well known in the prior art. The terminals 90, as with all terminals considered in the system of FIGURE 2, are actually receptacles 16 for plugs to set the program of operation for the system. The terminals 90 therefore provide fixed voltages which may be used as multipliers, or other factors representative of numerical values entering in a computation to be performed by the system.

A further set of voltages supplied by the power supply 80 are carried by conductors 94 and 96 through variable resistors 98 and 100 respectively, to the fixed terminals of parallel potentiometers 101 and 102. The potentiometer 101 has its variable contact mechanically coupled to the shaft 60 carrying the knobs 62 and 64 as previously described. Therefore, the potentiometer 101 is embodied in the potentiometer 58 of FIGURE 1 and serves to provide a signal to terminal 104 normally employed as one of the belance signals. The shaft 60 is also mechanically coupled to the movable contact of a potentiometer 106 (also embodied in the potentiometer unit 58). The fixed terminals of the potentiometer 106 are therefore available for use in various programs.

The operation, as described above, will normally involve balancing a voltage tapped from one of the potentiometers 101 or 106 against the voltage derived from one of the amplifiers A. This balancing operation is accomplished by a meter 108 which is connected to terminals 110 and 112 to facilitate the desired programming connection.

The operation of operational amplifiers or computing amplifiers as they are sometimes called to accomplish computation it is well known in the prior art. For example, the operational techniques of systems incorporating these amplifiers is described in detail in a publication, "A New Type of Differential Analyzer," by Bush & Caldwell, Journal of the Franklin Institute, vol. 240, No. 4, October 1945. In general, depending upon the manner in which the amplifiers are programmed, they are capable of performing various mathematical functions by manipulating received electrical signals to provide other electrical signals representative of output mathematical quantities.

In the operation of the amplifiers in the system considerable accuracy is provided. However, during intervals when the amplifiers are operated as integrators, a computing error may become significant. When an amplifier operates in an integrating fashion, the function is to provide a linear output voltage indicative of the summation of the received input voltage. Of course, the general operation of integrating circuits is well known in the prior art and it is well appreciated that one problem in the operation of these circuits is that they actually provide an exponential curve and not a truly linear curve. In the past, linear operation has been obtained by providing exceedingly high-gain amplifiers or by providing exceedingly sophisticated and complex amplifier control circuits. In accordance with the present invention, a relatively simple correction circuit is provided to maintain a more linear mode of operation. The amplifier circuit for accomplishing this operation is disclosed in FIGURE 3 and will now be considered in detail.

Figure 3:
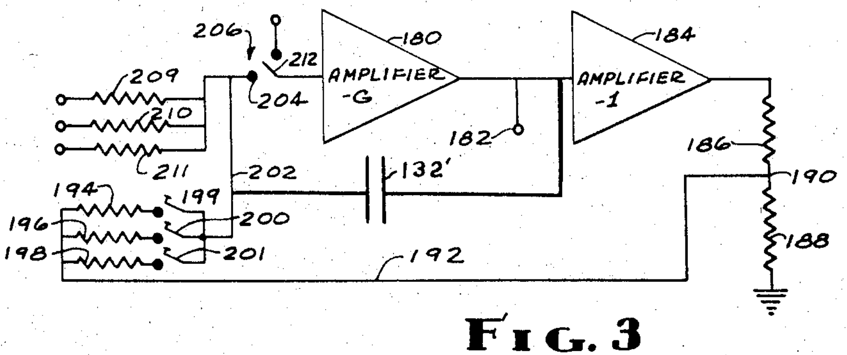
FIGURE 3 is a diagrammatic representation of an alternative amplifier which may be incorporated in the system of FIGURE 2.

Referring to FIGURE 3 there is shown an amplifier 180 which may take the form of the amplifier A2 as shown in FIGURE 2, and which has an output connected to a terminal 182 and to a second amplifier 184 which serves simply as a phase reversal unit. The amplifier 184 has an output that is applied through serially-connected resistors 186 and 188 to ground potential. The resistor 188 is substantially smaller than the resistor 186 so that the voltage at the junction point 190 between these resistors (in normal operation) is the reciprocal of the gain of the amplifier 180. That is, the amplifier 180 has a predetermined gain of G; therefore, the voltage appearing at the junction point 190 is $1/G$. The junction point 190 is connected by a conductor 192 to a feedback network incorporating parallel resistors 194, 196 and 198 which are each serially connected with switches 199, 200 and 201, respectively. The switches are then connected to a common point and returned through a conductor 202 to a stationary contact 204 of a switch 206. The contact 204 is then connected to resistors 209, 210, and 211, each of which is in turn connected to an input terminal. The switch 206 has a movable contact 212 which is connected to the input of the amplifier 180. In the operation of the system of FIGURE 3, the output from the amplifier 180 during integrating operations is phase inverted by the amplifier 184, reduced in amplitude by the resistors 186 and 188 to provide a signal having a magnitude of $1/G$ which is applied as positive feedback to the input of the amplifier 80 thereby tending to correct for the asymptotic characteristic of the conventional integrator circuit. In applying the positive feedback signal the switches 199, 200, and 201 must be selectively closed to coincide with the presence or absence of applied signals to the resistors 209, 210, and 211. That is, if an input is applied only to the resistor 209, then the switch 199 must be closed exclusively to energize the resistor 194 which coincides in resistance to the resistor 209. Of course, the resistor 196 equals the value of the resistor 210 and the resistor 198 equals the value of the resistor 211. Therefore, the input is maintained matched and the desired correction is obtained.

By compensating for the exponential nature of an integrating curve, in this manner, a rather simple circuit is provided which is economical to manufacture and yet obtains relatively high accuracy in operation. This important feature of the present invention results from the selective application of $1/G$ of the gain G of the amplifier as positive feedback.

Another important feature of the present invention resides in the self-balancing structure which incorporates a cell or other structure providing an output signal that is related to a state of charge.

Other and incidental objects and features of the system of the invention will become apparent along with various other arrangements in which the invention may be utilized. However, the scope of the inventions hall not be determined except in accordance with the claims, as follows.

What is claimed is:

1. An electrical computing system comprising:
means for representing mathematical quantities by first electrical signals,
plural means for functionally altering manipulating electrical signals to derive second electrical signals representative of values mathematically related to said mathematical quantities in accordance with a predetermined program;
program means for interconnecting said means for manipulating, and said means for representing, to transfer said first and said second electrical signals;
a plotting board;
a carriage body mounted to traverse said plotting board;
an indicator body, including an indicator for said plotting board, and a meter means for manifesting a selected one of said electrical signals, said indicator body being mounted to traverse said carriage;
motive means for driving one of said bodies at a predetermined rate of speed; and
manually controllable means for driving the other of said bodies in accordance with indications of said meter means, whereby to plot variations in said one of said electrical signals over an independent time interval.

2. A system according to claim 1 wherein said manually-controllable means comprises a first drive handle for hand control by one hand an a second drive handle for control by another hand and means for interconnecting said handles.

3. A system according to claim 1 wherein said means for altering includes: at least one electrical computing amplifier having a gain of G, an input and an output, for integrating a signal, inverting means connected to the output of said amplifier for inverting the phase of said output; means for applying a portion of substantially $1/G$ the signal from said inverting means as positive feedback to the input of said amplifier.

References Cited

UNITED STATES PATENTS

| | | | |
|---|---|---|---|
| 1,857,959 | 5/1932 | Isler | 346—17 |
| 2,621,292 | 12/1952 | White | 235—183 |
| 3,016,197 | 1/1962 | Newbold | 235—183 |
| 3,127,565 | 3/1964 | Williams | 235—183 |
| 3,167,378 | 1/1965 | Talle | 346—32 |

MALCOLM A. MORRISON, *Primary Examiner.*

ROBERT W. WEIG, *Assistant Examiner.*

U.S. Cl. X.R.

346—17